U S008833196B2

(12) United States Patent
Furuichi et al.

(10) Patent No.: US 8,833,196 B2
(45) Date of Patent: Sep. 16, 2014

(54) GEAR UNIT AND ROBOT

(75) Inventors: Masatoshi Furuichi, Kitakyushu (JP); Hiroki Sanemasa, Kitakyushu (JP)

(73) Assignee: Kabushiki Kaisha Yaskawa Denki, Kitakyushu-Shi, Fukuoka (JP)

( * ) Notice: Subject to any disclaimer, the term of this patent is extended or adjusted under 35 U.S.C. 154(b) by 117 days.

(21) Appl. No.: 13/606,184

(22) Filed: Sep. 7, 2012

(65) Prior Publication Data

US 2013/0074651 A1    Mar. 28, 2013

(30) Foreign Application Priority Data

Sep. 27, 2011  (JP) ................................. 2011-211148

(51) Int. Cl.
*B25J 17/00*  (2006.01)
*B25J 17/02*  (2006.01)
*B25J 18/00*  (2006.01)
*B25J 9/04*  (2006.01)
*B25J 9/10*  (2006.01)
*F16H 1/22*  (2006.01)

(52) U.S. Cl.
CPC .............. *B25J 9/042* (2013.01); *F16H 1/222* (2013.01); *B25J 9/102* (2013.01)
USPC .................................................. 74/490.01

(58) Field of Classification Search
USPC ............... 74/490.01, 490.03, 490.05, 490.06
See application file for complete search history.

(56) References Cited

U.S. PATENT DOCUMENTS

| 5,894,761 | A  | * | 4/1999  | Danielsson et al. | ........ | 74/490.06 |
| 5,924,330 | A  | * | 7/1999  | Danielsson et al. | ........ | 74/490.06 |
| 6,737,826 | B2 | * | 5/2004  | Gilchrist  | .................. | 318/568.21 |
| 6,893,204 | B1 | * | 5/2005  | Suzuki et al. | ............... | 414/744.5 |
| 7,926,377 | B2 | * | 4/2011  | Larsson et al. | .................. | 74/409 |
| 2009/0266194 | A1 | * | 10/2009 | Zhang et al. | ............... | 74/490.01 |
| 2009/0314120 | A1 | * | 12/2009 | Larsson | ................... | 74/490.02 |
| 2013/0055842 | A1 | * | 3/2013  | Okada | ........................ | 74/490.03 |

FOREIGN PATENT DOCUMENTS

| JP | S60-9696 A | 1/1985 |
| JP | S62-88587 A | 4/1987 |
| JP | 2007-216364 | 8/2007 |

OTHER PUBLICATIONS

Japanese Office Action dated Aug. 20, 2013 and English translation thereof.

* cited by examiner

*Primary Examiner* — Justin Krause
(74) *Attorney, Agent, or Firm* — Bacon & Thomas, PLLC

(57) ABSTRACT

A gear unit includes an inner shaft and an outer shaft concentrically arranged to make up two concentric output shafts; and a first and a second input shaft extending in a direction orthogonal to the output shafts and operatively connected to the inner shaft and the outer shaft, respectively. The inner shaft includes an inner gear attached thereto and the outer shaft includes an outer gear attached thereto. The inner gear and the outer gear are arranged in a mutually-opposing relationship. The first input shaft and the second input shaft are spaced apart from each other by a specified distance along an axial direction of the output shafts. The first input shaft includes a first input gear meshing with the inner gear and the second input shaft includes a second input gear meshing with the outer gear.

7 Claims, 6 Drawing Sheets

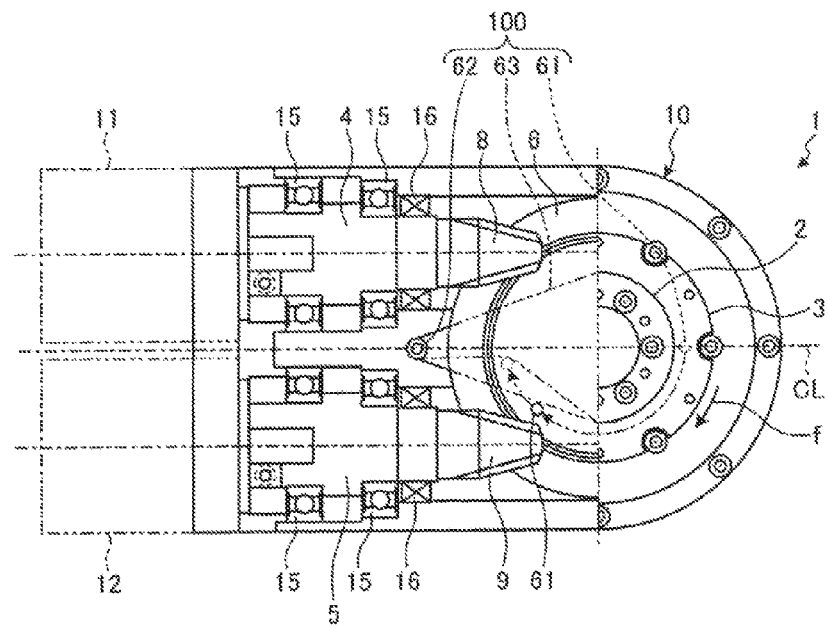
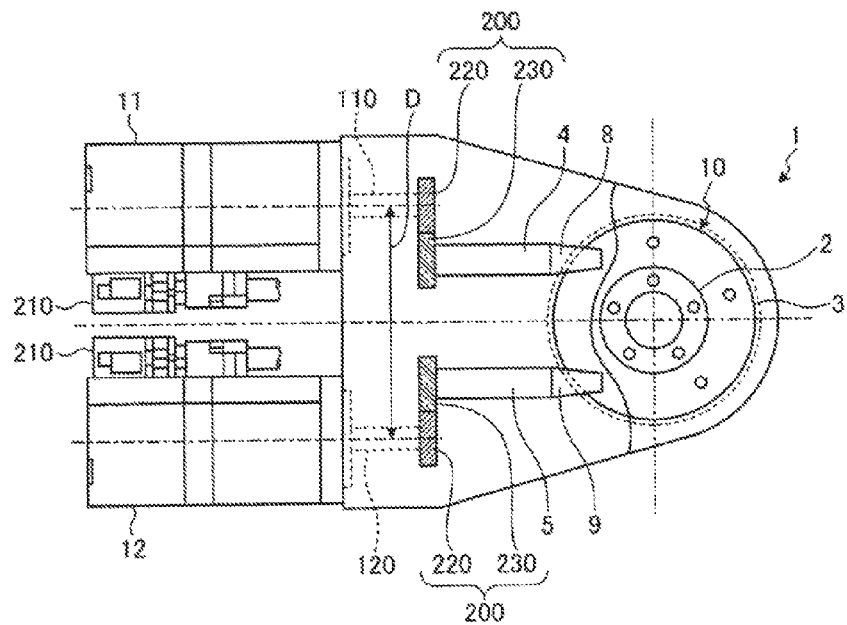

ered to the inner shaft 2 through gears. The power of the second motor 12 can be directly transferred from the second input shaft 5 to the outer shaft 3 through gears.
GEAR UNIT AND ROBOT

CROSS-REFERENCE TO RELATED APPLICATIONS

The present disclosure contains subject matter related to that disclosed in Japanese Priority Patent Application JP 2011-211148 filed in the Japan Patent Office on Sep. 27, 2011, the entire contents of which are hereby incorporated by reference.

BACKGROUND OF THE INVENTION

1. Field of the Invention

The present invention relate to a gear unit and a robot.

2. Description of the Related Art

Conventionally, as a configuration for driving joints that interconnect arms or hands of a robot, there is known a drive mechanism in which timing belts are wound on pulleys provided in a plurality of concentric rotation shafts and in which the rotation shafts are independently driven through the timing belts (see, e.g., Japanese Patent Application Publication No. 2007-216364).

SUMMARY OF THE INVENTION

In accordance with one aspect of the present invention, there is provided a gear unit, including: an inner shaft and an outer shaft concentrically arranged to make up two concentric output shafts; and a first and a second input shaft extending in a direction orthogonal to the output shafts and operatively connected to the inner shaft and the outer shaft, respectively, wherein the inner shaft includes an inner gear attached thereto and the outer shaft includes an outer gear attached thereto, the inner gear and the outer gear being arranged in a mutually-opposing relationship, the first input shaft and the second input shaft being spaced apart from each other by a specified distance along an axial direction of the output shafts, the first input shaft including a first input gear meshing with the inner gear, the second input shaft including a second input gear meshing with the outer gear.

BRIEF DESCRIPTION OF THE DRAWINGS

The objects and features of the present invention will become apparent from the following description of embodiments, given in conjunction with the accompanying drawings, in which:

FIG. 4A is a plan view showing a gear unit according to a first modified example;

FIG. 4B is a plan view showing a gear unit according to a second modified example;

DESCRIPTION OF THE EMBODIMENTS

Embodiments of a gear unit and a robot disclosed in the subject application will now be described with reference to the accompanying drawings which form a part hereof. However, the present disclosure is not limited to the embodiments to be described below.

First Embodiment

Figure 1:
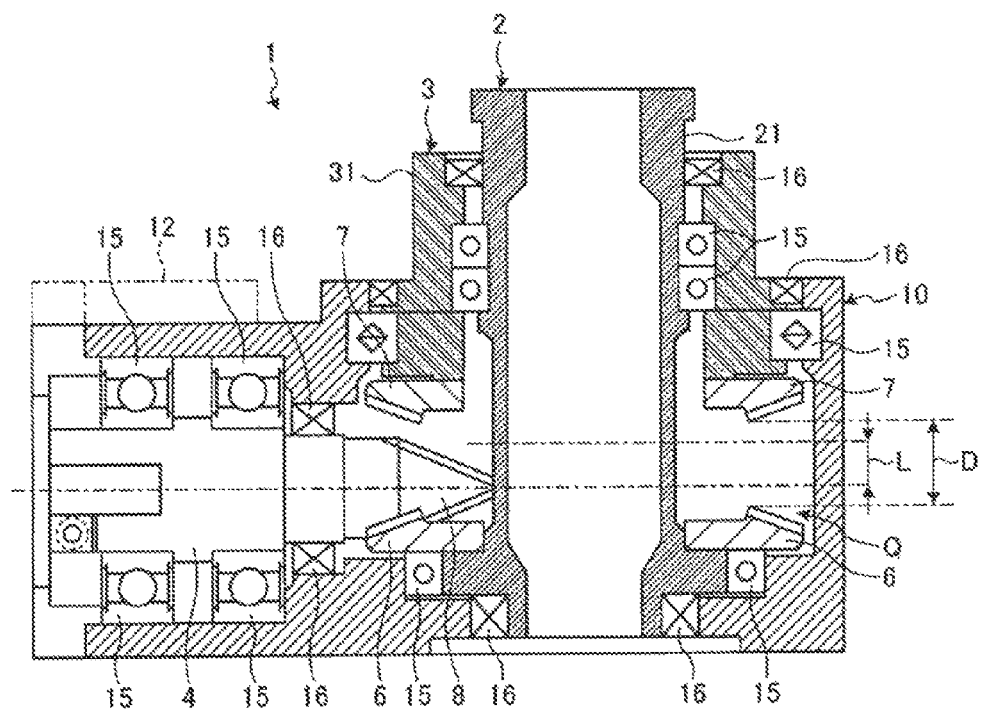
FIG. 1 is a vertical section view showing a gear unit according to a first embodiment.
Figure 2:
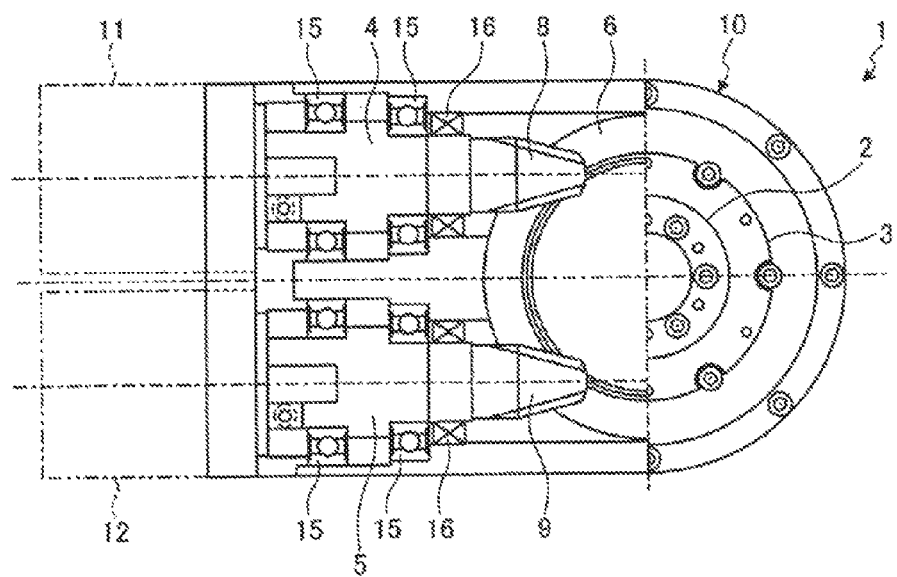
FIG. 2 is a plan view of the gear unit.
Figure 3:
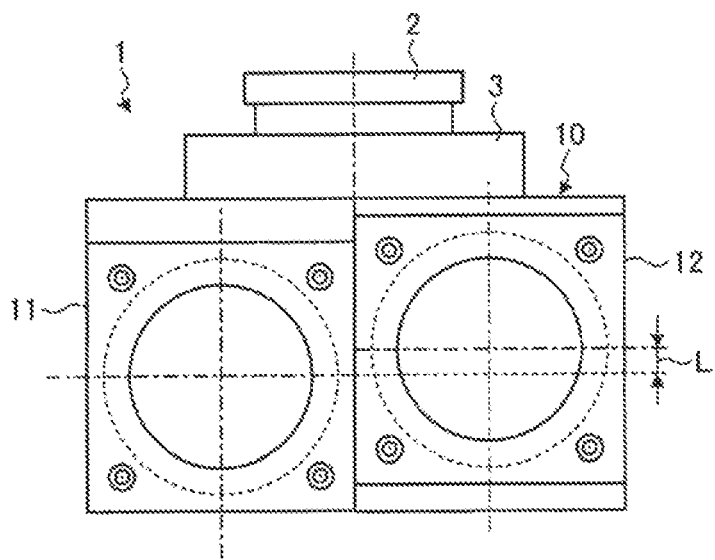
FIG. 3 is a rear view of the gear unit.

FIG. 1 is a vertical section view showing a gear unit in accordance with a first embodiment of the present invention. FIG. 2 is a plan view of the gear unit. FIG. 3 is a rear view of the gear unit. First, description will be made on a gear unit 1 in accordance with the present embodiment.

As shown in FIGS. 1 through 3, the gear unit 1 includes two concentric output shafts including an inner shaft 2 and an outer shaft 3, both of which have a concentric center axis, and two input shafts including a first input shaft 4 and a second input shaft 5.

The first input shaft 4 is operatively connected to a first motor 11. The second input shaft 5 is operatively connected to a second motor 12.

The power of the first motor 11 can be directly transferred from the first input shaft 4 to the inner shaft 2 through gears. The power of the second motor 12 can be directly transferred from the second input shaft 5 to the outer shaft 3 through gears.

Thus the gear unit 1, the first motor 11 and the second motor 12 can serve as a drive unit for driving a driven member such as an arm of a robot to be described later.

As shown in FIG. 1, an inner gear 6 is provided near one end (the lower end in FIG. 1) of the inner shaft 2 as one of the output shafts. An outer gear 7 is provided near one end (the lower end in FIG. 1) of the outer shaft 3 shorter than the inner shaft 2. On the other hand, a first input gear 8 is provided at the tip end of the first input shaft 4 as one of the input shafts. A second input gear 9 is provided at the tip end of the second input shaft 5.

The input shafts and the output shafts are attached to a unit case 10 through bearings 15 and seal members 16 in a mutually orthogonal relationship.

A through-hole is formed on one surface (the upper surface in FIG. 1) of the unit case 10. The output shafts (the inner shaft 2 and the outer shaft 3) are inserted into the through-hole. An opening is formed on another surface (the left surface in FIG. 1) of the unit case 10 orthogonal to the through-hole. The input shafts are inserted through the opening.

Within the unit case 10, the inner gear 6 and the outer gear 7 are arranged in a mutually-opposing relationship. In other words, the inner gear 6 provided near one end of the relatively long inner shaft 2 and the outer gear 7 provided near one end of the relatively short outer shaft 3 are arranged in a mutually-opposing relationship with a specified gap D left therebetween so that the teeth array of the inner gear 6 and the teeth array of the outer gear 7 can face each other.

The space formed in the specified gap D becomes a gear meshing space Q. In the present embodiment, the size of the gear unit 1 is reduced by forming the gear meshing space Q as small as possible.

Within the gear meshing space Q formed as small as possible, the first input shaft 4 and the second input shaft 5 are spaced apart from each other by a specified distance L along the direction of a concentric axis of the output shafts including the inner shaft 2 and the outer shaft 3.

In a posture in which the input shafts extend in a horizontal direction, the gear unit 1 of the present embodiment is configured so that, as shown in FIG. 1, the first input shaft 4 arranged in a relatively low position is operatively connected to the inner shaft 2 while the second input shaft 5 arranged in a relatively high position is operatively connected to the outer shaft 3.

In this manner, the first input shaft 4 and the second input shaft 5 are mutually offset along the output shafts so that the first input gear 8 of the first input shaft 4 meshes with the inner gear 6 and the second input gear 9 of the second input shaft 5 meshes with the outer gear 7 within the gear meshing space Q formed between the inner gear 6 and the outer gear 7.

Accordingly, the gear unit 1 in accordance with the present embodiment is configured to have a small size. Nevertheless, the set of the inner gear 6 and the first input gear 8 and the set of the outer gear 7 and the second input gear 9 do not interfere with each other and can make up independent power transfer systems.

In the gear unit 1 in accordance with the present embodiment, the set of the inner gear 6 and the first input gear 8 and the set of the outer gear 7 and the second input gear 9 are made up of hypoid gears.

Therefore, the axis of the first input shaft 4 provided with the first input gear 8 does not intersect the axis of the inner shaft 2 provided with the inner gear 6 meshing with the first input gear 8. Likewise, the axis of the second input shaft 5 provided with the second input gear 9 does not intersect the axis of the outer shaft 3 provided with the outer gear 7 meshing with the second input gear 9.

Thus, the first input shaft 4 and the second input shaft 5 can be arbitrarily arranged without having to align the axes of the first input shaft 4 and the second input shaft 5 with the axis of the inner shaft 2 or the outer shaft 3. This makes it possible to increase the degree of freedom of layout of the drive unit including the first motor 11 and the second motor 12.

For example, as shown in FIG. 2, the first input shaft 4 and the second input shaft 5 may be arranged in a parallel relationship with each other.

Since the first input shaft 4 and the second input shaft 5 can be arranged parallel to each other using the hypoid gears, it becomes possible to arrange the first motor and the second motor 12 side by side in the same orientation. This makes it possible to further reduce the size of the gear unit 1 in cooperation with the gear meshing space Q formed as small as possible with the specified gap D.

As described above, the gear unit 1 in accordance with the present embodiment is basically configured to include the inner shaft 2, the outer shaft 3 concentric with the inner shaft 2, the first input shaft 4 operatively connected to the inner shaft 2, and the second input shaft 5 operatively connected to the outer shaft 3. The inner shaft 2 and the outer shaft 3 make up two concentric output shafts. The first input shaft 4 and the second input shaft 5 extend in the direction orthogonal to the output shafts.

The inner gear 6 attached to the inner shaft 2 and the outer gear 7 attached to the outer shaft 3 are arranged in a mutually-opposing relationship.

The first input shaft 4 and the second input shaft 5 are spaced apart from each other by the specified distance L in the axial direction of the output shafts. The first input gear 8 of the first input shaft 4 is arranged to mesh with the inner gear 6 while the second input gear 9 of the second input shaft 5 is arranged to mesh with the outer gear 7.

This configuration makes it possible to reduce the size of the gear unit 1. The torque of the first input shaft 4 connected to the first motor 11 is directly transferred to the inner shaft 2 through the first input gear 8 and the inner gear 6. The torque of the second input shaft 5 connected to the second motor 12 is directly transferred to the outer shaft 3 through the second input gear 9 and the outer gear 7.

As shown in FIG. 1, the inner shaft 2 and the outer shaft 3 include a hollow shaft body 21 and a hollow shaft body 31, respectively. Thus, wiring and/or piping can be made through the shaft body 21 of the inner shaft 2.

In an instance where the gear unit 1 is applied to a robot and where arms or hands are connected to the output shafts as will be described later, wiring lines and air pipes leading to sensors and actuators provided in the arms or the hands can be inserted through the shaft body 21 of the inner shaft 2.

Modified Examples of the Gear Unit 1

Figure 4C:
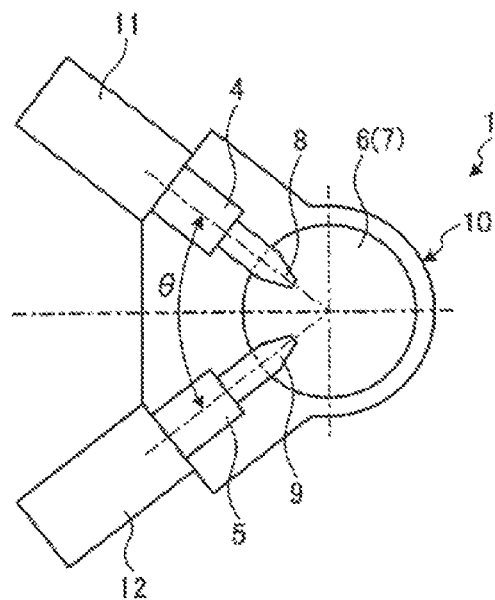
FIG. 4C is a plan view showing a gear unit according to a third modified example.

Next, certain modified examples of the gear unit 1 will be described with reference to FIGS. 4A through 4D. Referring to FIG. 4A, the gear unit 1 in accordance with a first modified example includes a stopper mechanism 100 for mechanically limiting the rotation angle of the output shafts to 180+α degrees in the forward rotation direction and in the reverse rotation direction.

In the stopper mechanism 100 of the gear unit 1 in accordance with the first modified example, as shown in FIG. 4A, a stopper pin 61 protrudes from the teeth array surface of the inner gear 6. A belt pin 62 protrudes from the inner wall of the unit case 10. The belt pin 62 is positioned on a centerline CL passing through the concentric axis of the inner shaft 2 and the outer shaft 3 as the output shafts. A stopper belt 63 is wound around the belt pin 62 and the inner shaft 2 with an appropriate tension. Preferably, the stopper belt 63 is an elastic belt having a suitable elasticity.

With this configuration, if the inner gear 6 is rotated by the torque of the first motor 11 transferred through the first input shaft 4 (the first input gear 8), the stopper pin 61 is also rotated together with the rotation of the inner gear 6 as indicated by an arrow f in FIG. 4A.

When rotated to a specified angle, the stopper pin 61 comes into contact with the stopper belt 63. As shown in FIG. 4A, the rotation of the inner gear 6 is restrained in a state that the stopper pin 61 pushes the stopper belt 63 by a specified amount. Thus the inner shaft 2 rotating together with the inner gear 6 having the stopper pin 61 is restrained from further rotation.

While the rotation angle of the inner shaft 2 is restrained in the illustrated example, the same configuration may be applied to the outer shaft 3 or to both the inner shaft 2 and the outer shaft 3.

Next, a second modified example will be described with reference to FIG. 4B. In the gear unit 1 of the second modified example shown in FIG. 4B, an intermediate gear mechanism 200 is interposed between the first motor 11 and the first input shaft 4 and between the second motor 12 and the second input shaft 5.

This configuration makes it possible to cope with a situation where the arrangement position of the first motor or the second motor 12 is limited under certain circumstances or a situation where the first motor 11 or the second motor 12 has an excessively large size. In other words, this configuration makes it possible to cope with a situation where, if the first input shaft 4 and the second input shaft 5 are directly connected to motor shafts 110 and 120, the first input gear 8 and the second input gear 9 cannot mesh with the inner gear 6 and the outer gear 7.

The example shown in FIG. 4B is directed to a case where a restriction is imposed on the layout of motor connectors 210 and where a gap needs to be formed between the first motor 11 and the second motor 12. In other words, the example shown in FIG. 4B is directed to a case where the distance D between the motor shafts 110 and 120 is so large that the first input gear 8 and the second input gear 9 cannot mesh with the inner gear 6 and the outer gear 7 if the first input shaft 4 and the second input shaft 5 are connected to the motor shafts 110 and 120.

As shown in FIG. 4B, a first spur gear 220 is attached to the tip end of the motor shaft 110 of the first motor 11. A second spur gear 230 is attached to the base end of the first input shaft 4. The first spur gear 220 and the second spur gear 230 are arranged to mesh with each other. If the intermediate gear mechanism 200 including the first spur gear 220 and the second spur gear 230 is used in this manner, there is no limitation in the kinds of usable motors. This helps increase the flexibility of the gear unit 1.

Figure 4D:
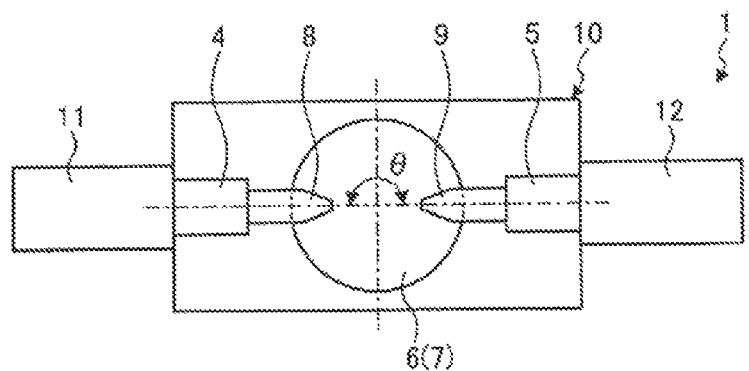
FIG. 4D is a plan view showing a gear unit according to a fourth modified example.

Next, third and fourth modified examples will be described with reference to FIGS. 4C and 4D. In the gear units 1 in accordance with the third and fourth modified examples, the inner gear 6 and the first input gear 8 are formed of bevel gears. Likewise, the outer gear 7 and the second input gear 9 are formed of bevel gears.

Unlike the hypoid gears, the use of the bevel gears makes it possible to freely set the intersection angle of the axes of the first input shaft 4 and the inner shaft 2 and the intersection angle of the axes of the second input shaft 5 and the outer shaft 3.

More specifically, in the first input gear 8 and the inner gear 6 meshing with each other, the axis of the first input shaft 4 having the first input gear 8 and the axis of the inner shaft 2 having the inner gear 6 can be intersected at a specified angle. Likewise, in the second input gear 9 and the outer gear 7 meshing with each other, the axis of the second input shaft 5 having the second input gear 9 and the axis of the outer shaft 3 having the outer gear 7 can be intersected at a specified angle.

Accordingly, as shown in FIG. 4C, the angle θ between the first input shaft 4 and the second input shaft 5 can be set appropriately. As shown in FIG. 4D, the angle θ may be set to 180 degrees, in which case the first input shaft 4 and the second input shaft 5 are arranged on a straight line. Just like the inner gear 6 and the outer gear 7, the first input gear 8 and the second input gear 9 may be arranged in a mutually-opposing relationship.

In the present modified examples, as in the case where the hypoid gears are used, it is possible to reduce the length (height) of the gear unit 1 in the direction of the output shafts. This makes it possible to reduce the size of the gear unit 1.

Figure 5:
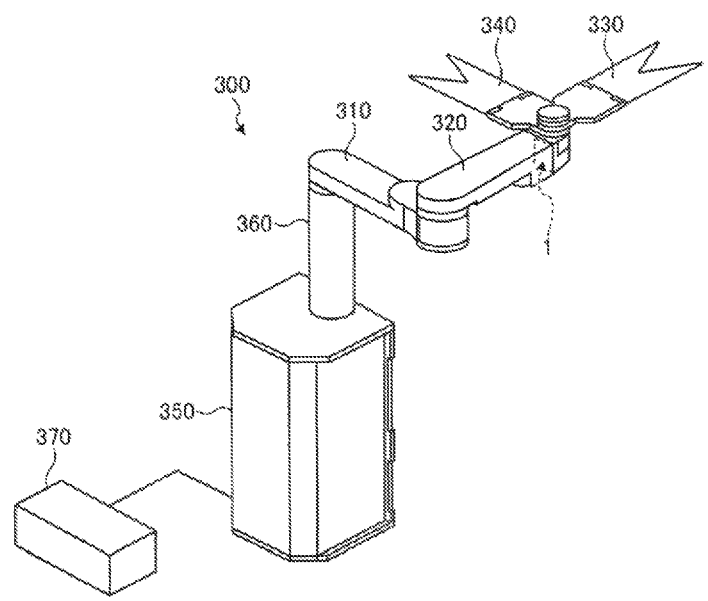
FIG. 5 is a schematic explanatory view showing an instance in which the gear unit according to the first embodiment is applied to a robot.

Referring to FIG. 5, the gear unit 1 described above can be applied to a robot 300 including arms 310 and 320 and hands 330 and 340.

As shown in FIG. 5, the robot 300 is of a horizontal articulated type. A support post 360 is installed to protrude from a base 350. The base end of a first arm 310 is rotatably connected to the upper end of the support post 360.

The base end of the second arm 320 is rotatably connected to the tip end of the first arm 310. A first hand 330 and a second hand 340 are attached to the upper side of the tip end of the second arm 320 in a vertically-overlapping state and in an independently-rotatable manner. The first hand 330 and the second hand 340 are configured to support or grip a specified workpiece.

In the present embodiment, the gear unit 1 is arranged in the tip end portion of the second arm 320 so as to independently drive the first hand 330 and the second hand 340.

In other words, the first motor 11 and the second motor 12 are operatively connected to the first input shaft and the second input shaft 5 of the gear unit 1. The first hand 330 is connected to the inner shaft 2 while the second hand 340 is connected to the outer shaft 3.

With this configuration, if the first motor 11 rotates, the torque of the first motor 11 is transferred to the inner shaft 2 through the first input gear 8 of the first input shaft 4 and the inner gear 6, whereby the first hand 330 connected to the inner shaft 2 is rotationally driven in the horizontal direction.

Similarly, if the second motor 12 rotates, the torque of the second motor 12 is transferred to the outer shaft 3 through the second input gear 9 of the second input shaft 5 and the outer gear 7, whereby the second hand 340 connected to the outer shaft 3 is rotationally driven in the horizontal direction.

In this manner, the first hand 330 and the second hand 340 of the robot 300 shown in FIG. 5 are operated independently of each other about a concentric rotation axis.

As shown in FIG. 5, the robot 300 is electrically connected to a control unit 370 including a computer provided with a central processing unit and a memory for storing a robot operation control program. The operation of the first motor 11 and the second motor 12 is controlled by the control unit 370 depending on the content of works. The first hand 330 and the second hand 340 rotating independently of each other perform a specified operation pursuant to the operation control program.

The unit case 10 of the gear unit 1 corresponds in shape and size to the second arm 320. For example, the gear unit 1 is attached to the second arm 320 having an opened tip end from the outside, whereby the second arm 320 and the gear unit 1 can be unified.

Needless to say, it may be possible to employ a configuration in which the unit case 10 of the gear unit 1 is arranged within the tip end portion of the second arm 320.

In the embodiment described above, the inner gear 6 and the outer gear 7 are substantially equal in diameter to each other. However, the diameters of the inner gear 6 and the outer gear 7 need not be necessarily equal to each other. The inner gear 6 and the outer gear 7 may differ in size from each other. In other words, it is only necessary that the first input gear 8 and the second input gear 9 correspond to the inner gear 6 and the outer gear 7 and further that the power of the first motor 11 be independently and directly transferred to the inner shaft 2 and the power of the second motor 12 be independently and directly transferred to the outer shaft 3.

Second Embodiment

Figure 6:
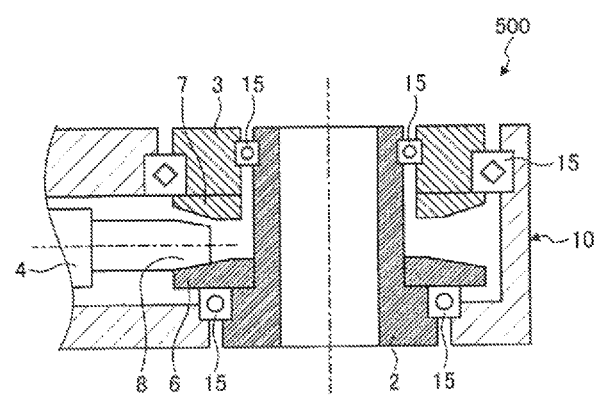
FIG. 6 is a vertical section view showing a gear unit according to a second embodiment.

Next, a gear unit 500 in accordance with a second embodiment will be described with emphasis placed on the portions differing from the first embodiment. In the following description, the same parts as those of the gear unit 1 in accordance with the first embodiment or the parts having the same functions as those of the gear unit 1 in accordance with the first embodiment will be designated by like reference symbols with the description thereon simplified or omitted. FIG. 6 shows the gear unit 500 more schematically than in FIG. 1. The second input gear 9 meshing with the outer gear 7 of the outer shaft 3 and the second input shaft 5 provided with the second input gear 9 at the tip end thereof are not shown in FIG. 6.

The gear unit 500 in accordance with the second embodiment is capable of outputting power from the opposite ends (the upper and lower ends in FIG. 6) of the output shafts. More specifically, in case of the gear unit 1 in accordance with the first embodiment, the power is outputted from one ends (the upper ends in FIG. 1) of the inner shaft 2 and the outer shaft 3.

In contrast, as shown in FIG. 6, the gear unit 500 in accordance with the second embodiment is capable of outputting power from the opposite end (the lower end in FIG. 6) of the inner shaft 2 from the outer shaft 3. In other words, the gear unit 500 in accordance with the second embodiment is capable of outputting power from the opposite ends of the unit case 10.

Figure 7A:
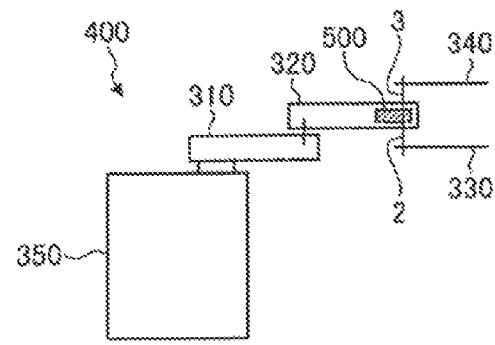
FIG. 7A is a schematic explanatory view showing one instance in which the gear unit according to the second embodiment is applied to a robot.
Figure 7B:
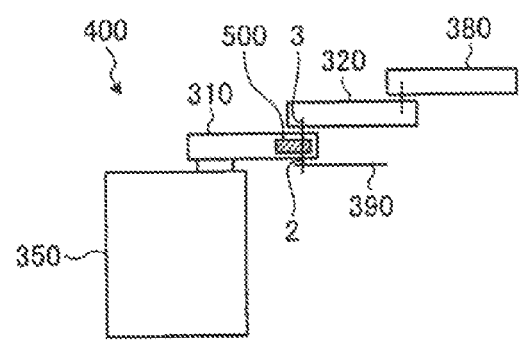
FIG. 7B is a schematic explanatory view showing another instance in which the gear unit according to the second embodiment is applied to a robot.
Figure 7C:
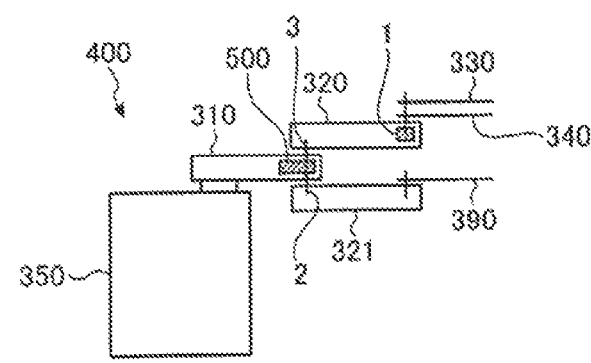
FIG. 7C is a schematic explanatory view showing a further instance in which the gear unit according to the second embodiment is applied to a robot.

Examples in which the gear unit 500 of the above structure is applied to a robot will be described with reference to FIGS. 7A through 7C. In the following description, the same parts as those of the robot 300 in accordance with the first embodiment or the parts having the same functions as those of the robot 300 in accordance with the first embodiment will be designated by like reference symbols with the description thereon simplified or omitted. The robot 400 shown in FIGS. 7A through 7C is more schematically shown than in FIG. 5. The support post 360 for supporting the base end of the first arm 310 is not shown in FIGS. 7A through 7C.

In the robot 400 shown in FIG. 7A, just like the robot 300 in accordance with the first embodiment, the gear unit 500 is provided in the tip end portion of the second arm 320. Since the gear unit 500 is capable of outputting power from the opposite ends of the unit case 10, the first hand 330 is connected to the inner shaft 2 so as to extend from the lower side of the second arm 320 rather than the upper side thereof.

In the robot 400 shown in FIG. 7B, the gear unit 500 is arranged in the tip end portion of the first arm 310. The second arm 320 is connected to the outer shaft 3 so as to extend from the upper side of the first arm 310. A third arm 380 is connected to the tip end of the second arm 320. On the other hand, a specified hand 390 is connected to the inner shaft 2 of the gear unit 500 so as to extend from the lower side of the first arm 310. In other words, the arm extends from one of the upper and lower sides of the first arm 310 and the hand extends from the other of the upper and lower sides of the first arm 310.

In the robot 400 shown in FIG. 7C, the gear unit 500 is arranged in the tip end portion of the first arm 310. The second arm 320 is connected to the outer shaft 3 while a third arm 321 is connected to the inner shaft 2. In other words, the second arm 320 extends from the upper side of the first arm 310. The third arm 321 extends from the lower side of the first arm 310. In this configuration, the arms extend from the upper and lower sides of the first arm 310.

In the example shown in FIG. 7C, a single specified hand 390 is connected to the tip end of the third arm 321 extending from the lower side of the first arm 310. On the other hand, the gear unit 1 in accordance with the first embodiment is arranged in the tip end portion of the second arm 320 extending from the upper side of the first arm 310. The first hand 330 and the second hand 340 are connected to the gear unit 1.

As described above, the gear units 1 and 500 can be desirably used in the joints of the arms or the hands of the robots 300 and 400. Since the gear units 1 and 500 are small in size, they can be arranged within the tip end portion of the arm or can be attached to the outer surface of the arm. Since the power can be outputted from one end or both ends of the output shaft, it is possible to increase the degree of freedom in designing the robots 300 and 400.

Application of the gear unit 1 is not limited to a robot. Even if the gear unit 1 is applied to a robot, the kind of the robot is not necessarily confined to the robots 300 and 300 described above.

New effects and other modified examples of the embodiments described above can be readily derived by those skilled in the art. For that reason, the broad aspect of the present invention is not limited to the specific disclosure and the representative embodiments shown and described above. Accordingly, the present invention can be modified in many different forms without departing from the spirit and scope of general inventive concept defined by the appended claims and the equivalents thereof.

What is claimed is:

1. A gear unit, comprising:
an inner shaft and an outer shaft concentrically arranged to make up two concentric output shafts;
a first and a second input shaft extending in a direction orthogonal to the output shafts and operatively connected to the inner shaft and the outer shaft, respectively; and
a stopper unit configured to limit a rotation angle of each of at least one of the output shafts,
wherein the inner shaft includes an inner gear attached thereto and the outer shaft includes an outer gear attached thereto, the inner gear being arranged to face the outer gear, the first input shaft and the second input shaft being spaced apart from each other by a specified distance along an axial direction of the output shafts, the first input shaft including a first input gear meshing with the inner gear, the second input shaft including a second input gear meshing with the outer gear.

2. The gear unit of claim 1, wherein the inner gear, the first input gear, the outer gear and the second input gear are formed of hypoid gears, the first input shaft and the second input shaft being arranged parallel to each other.

3. The gear unit of claim 1, wherein the inner gear, the first input gear, the outer gear and the second input gear are formed of bevel gears.

4. The gear unit of claim 1, wherein the inner shaft and the outer shaft include hollow shaft bodies, respectively.

5. The gear unit of claim 1, wherein the stopper unit is configured to limit a rotation angle of the inner shaft and the stopper unit comprises a stopper pin protruding from a teeth array surface of the inner gear, a belt pin protruding from an inner wall of a case of the gear unit and being positioned on a centerline passing through a concentric axis of the inner shaft and the outer shaft, and a stopper belt being wound around the belt pin and the inner shaft.

6. The gear unit of claim 1, wherein the first input shaft is connected to a first motor through a first intermediate gear mechanism and the second input shaft is connected to a second motor through a second intermediate gear mechanism.

7. A robot, comprising:
a base;
an arm extending from the base;
a pair of hands operatively connected to a tip end of the arm; and
the gear unit of claim 1 arranged in the tip end of the arm, the hands being independently connected to the inner shaft and the outer shaft of the gear unit.

* * * * *